May 31, 1927.  1,630,964

J. N. NELSON

SPECTACLE TEMPLE

Filed Sept. 25, 1924

Inventor
John N. Nelson.

By Barlow & Barlow
Attorneys

Patented May 31, 1927.

1,630,964

UNITED STATES PATENT OFFICE.

JOHN N. NELSON, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

SPECTACLE TEMPLE.

Application filed September 25, 1924. Serial No. 739,851.

This invention relates to an improved construction of spectacle temple: and has for its object to provide a temple of this character which is formed of a length of non-metallic material having an enlarged end-piece shaped to present an extended surface for engaging the skull of the wearer.

A further object of this invention is to form this end-piece separately and connect it to the body of the temple by providing an extension portion on one member to be cemented into a socket in the other member.

This invention further consists in the provision of a wire core in the body portion of the temple, which extends into the end-piece to assist in securing the two together.

A further object of this invention is the forming of this end-piece with an enlarged skull-engaging surface and at the same time reducing its extremity so as to permit ready passage through a woman's hair.

A still further object of the invention is to cut the curved portion of the temple member helically to increase the flexibility of this portion, and in still other cases to cut the curved portion with a gradually decreasing pitch so as to progressively increase the flexibility of the temple towards its gripping end portion.

With these and other objects in view, the invention consists of certain novel features of construction, as will be more fully described, and particularly pointed out in the appended claims.

It is found in practice that spectacle temples of this character, particularly those which have a full curve to extend around the ear, are difficult for a lady to apply by passing the curved ends through her hair around the ear, to obviate which difficulty it is found of advantage to provide a so-called half skull or one with the end portion of the tubing curved slightly to extend over the ear and to have an enlarged end-piece set to grip the skull back of the ear, the enlarged end-piece being preferably shaped with an extended gripping surface and also with its extremity reduced so as to be readily passed through a woman's hair, which greatly facilitates her positioning of the spectacles. It is also found of advantage, in some cases, to employ the commercial non-metallic tubing with its highly finished surface and shape or reduce the same along its length into the form desired without destroying its highly finished surface, and in some instances to form the enlarged end-piece separately and attach to the extremity of the tubing and to then pass a wire through the tubing into the end-piece connecting the two together; and the following is a detailed description of the present embodiment of my invention showing one means by which these advantageous results may be accomplished:—

With reference to the drawings, 10 designates a temple member which may be formed in any suitable way but which is preferably formed of non-metallic tubing such as celluloid, zylonite, or the like which may be oval in cross section, or other suitable shape with its natural highly finished surface and which may be drawn down at its end as at 11 without destroying its high finish.

Figure 1:
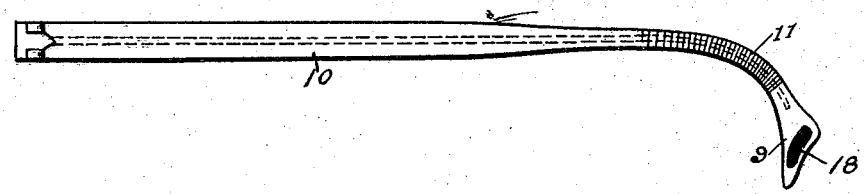
Figure 1 is a side elevation illustrating my improved temple with a separate end-piece connected thereto and also showing the helical cut on the curved portion thereof.
Figure 2:
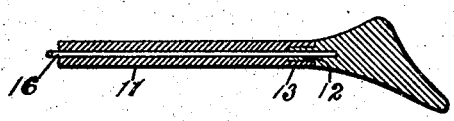
Figure 2 is an enlarged sectional view showing the end-piece as provided with an extension socket in the end of the temple body.
Figure 3:
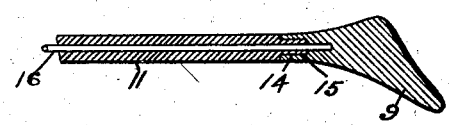
Figure 3 shows the end of the temple body as provided with an extension extending into a socket in the end-piece.
Figure 6:
Figure 6 is a sectional view showing the temple as provided with an integral enlargement at its end.
Figure 5:
Figure 5 illustrates an outline of a skull and showing my improved temple as extending over and gripping the skull in back of the ear.
Figure 4:
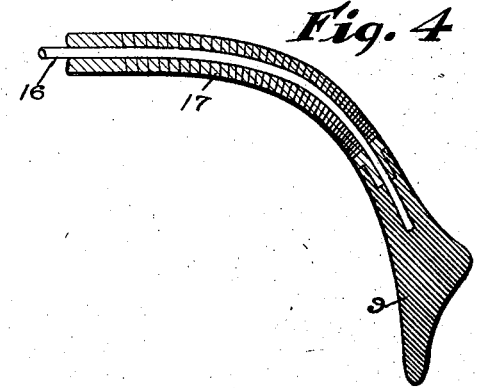
Figure 4 shows the end portion of the temple body as cut with a gradually decreasing pitch towards its end and a core of flexible wire extending through this curved portion into the end-piece which is connected thereto.

In order to obtain an extended surface for gripping the skull back of the ear, in some cases, the end of the temple may be upset as illustrated in Figure 6 or I may form a separate end-piece 9 and connect it to the end of the temple by forming an extension 12 on the end-piece and cementing it in a socket 13 formed in the end of the temple, while in other cases, I form an extension 14 on the end of the temple and cement it in the socket 15 formed in the end-piece, but I do not desire to be restricted to any particular means for connecting the two together, and I preferably pass a wire 16 through the hollow center of the temple member into the end-piece which strengthens the connection between the two. Also in some cases, I cut the end of the tubing helically as shown in Figures 1 and 4, the helical cut being preferably on the curved portion at the end of the temple and this cut 17, preferably, has a gradually decreasing pitch to progressively increase the flexibility of the tubing towards its extremity.

In some cases where the helical cut is employed to increase the flexibility of the gripping end of the temple, I preferably employ a core wire 16 which is very flexible in its construction or character.

This end-piece 9 is preferably formed substantially in the shape of a goose head providing an extended gripping surface to the side of the skull and the extremity or bill portion of the head is made somewhat pointed or reduced in size to readily pass through a woman's hair. Then again, this enlarged skull-gripping surface may be roughened to obtain a better grip on the skull and prevent slipping, and in still other cases I may insert a friction member into the gripping face of this enlarged end-piece as at 18 which may be of any suitable material such as sandpaper, shark skin, cork or any other suitable material which is possessed of highly-gripping or frictional characteristics.

I have herein shown and described an end-piece as formed separately and independently of the body of the temple, but in some instances, it may be found desirable to upset the end of the temple stock to provide the required enlarged or extended gripping surface desired.

My improved form of spectacle temple is very simple and practical in construction and effective in its action and by its use I may provide a temple having an extremely flexible end and also one that is adapted to be slightly curved to extend over the ear of the wearer and grip the skull back of the ear to firmly retain the spectacles in position on the face of the wearer.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A non-metallic spectacle temple member curved at its end to extend over the ear of the wearer and having an enlarged separate end-piece or member connected to its free end portion by providing one of said members with a socket and the other with a reduced portion to fit tightly in said socket.

2. A non-metallic spectacle temple member curved at its end to extend over the ear of the wearer and having an enlarged separate end-piece or member connected to its free end portion by providing one of said members with a socket and the other with an extension fitting tightly in said socket, and a strengthening wire core in the temple extending into the end-piece.

3. A spectacle temple formed of a tube of non-metallic material curved at its end to extend over the ear, a separate enlarged gripping end-piece or member attached to the free end of said temple and having a member of different material inserted into its gripping surface to cause it to cling to the skull of the wearer, and the extremity of said end-piece being reduced to permit a ready passage through a woman's hair.

4. A spectacle temple formed of a non-metallic member curved at its free end to extend over the ear of the wearer, a separate enlarged skull-engaging end-piece member, one member having an extension portion cemented in a socket in the other member, a stiffening wire core in the temple member extending into said end-piece, and the extremity of said end-piece being reduced to permit a ready passage through a woman's hair.

5. A spectacle temple formed of a rod of non-metallic material curved at its free end to extend over the ear of the wearer, said curved portion being cut in a helical form, a separate enlarged skull-engaging end-piece on said rod, and a strengthening wire core in said rod extending into said end-piece.

6. A spectacle temple formed of a hollow non-metallic tube curved at its free end and cut on said curved portion helically with a gradually decreasing pitch to progressively increase its flexibility, and an enlarged skull-engaging end-piece on the extremity of said curved portion.

7. A spectacle temple formed of a hollow non-metallic rod curved at its end and cut on said curved portion helically with a gradually decreasing pitch to progressively increase its flexibility, an enlarged skull-engaging end-piece on the extremity of said end portion, and a wire core extending through the rod into said end-piece.

8. A spectacle temple formed of a hollow non-metallic tube curved at its end and helically cut on said curved portion to increase its flexibility, an enlarged flattened skull engaging end piece on the extremity of said tube, and a wire core extending through the tube and into said end piece.

In testimony whereof I affix my signature.

JOHN N. NELSON.